July 28, 1925.
E. L. RING
APPARATUS FOR CURING TOBACCO
Filed Nov. 13, 1924
1,547,958
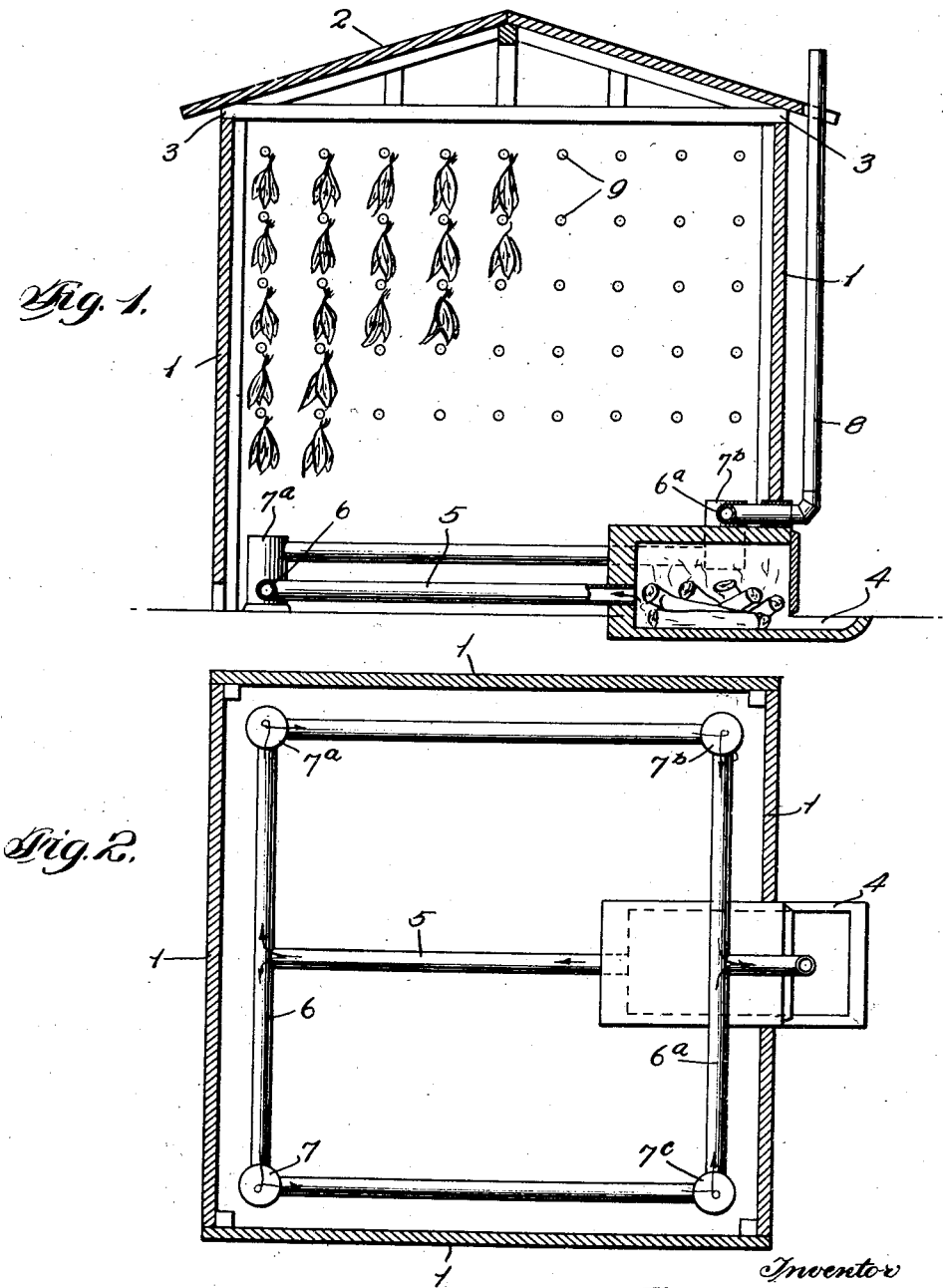
Inventor
Edward L. Ring.
By
Robt. H. Read
Attorney.

Patented July 28, 1925.

1,547,958

UNITED STATES PATENT OFFICE.

EDWARD L. RING, OF HAHIRA, GEORGIA.

APPARATUS FOR CURING TOBACCO.

Application filed November 13, 1924. Serial No. 749,734.

*To all whom it may concern:*

Be it known that I, EDWARD L. RING, a citizen of the United States, residing at Hahira, in the county of Lowndes and State of Georgia, have invented certain new and useful Improvements in Apparatus for Curing Tobacco, of which the following is a specification.

This invention relates to an apparatus for curing tobacco, and renders possible efficient treatment after harvesting the crop, and the attainment of uniform results in color and flavor of the harvested product. By the common process especially in the Southern States of the United States where the tobacco is cured in sheds or barns by heat treatment secured by waste timber or cordwood, the result is often uncertain, principally in my opinion, because the time and temperature is not rigidly observed, and the temperature is different in different parts of the curing chamber, so that the batch being treated is not uniform in color and content of moisture, with the result that molding and undue fermentation reduced the value of the product in the market.

I have discovered that much more uniform results are possible by curing the crop at definite temperatures gradually raised from the initial starting temperature in successive increments of heat, and more particularly by so distributing the heat that all parts of the curing chamber or barn are as nearly as possible uniformly heated, so that not only the same amount of moisture is driven off from the leaf and stem but all of the product is uniform in color. I secure this desirable result by a gradual increase of heat for definite periods of time, and by effecting such a distribution of the heat in a particular system of distribution as to give increased radiating surface, especially at or near the corners of the curing chamber, where I have discovered the heat is deficient and considerably lower than in the body of the curing chamber. In carrying out my process I hold the temperature constant at 95 to 100 degrees Fah. for from 24 to 26 hours or until the desired yellow color is attained. Then the temperature is raised at the rate of 5 degrees every two hours until a temperature is attained of 140 degrees; this temperature is held constant by careful stoking of the furnace until the leaf is dry, which will occur approximately in 24 hours. The leaf by this treatment is substantially cured, but the stem has not been sufficiently dried, and if the process is discontinued at this stage moulding and damaging fermentation would ensue. I therefore continue the heat treatment for a further period, progressively raising the temperature to 170–180° at the rate of 5 degrees every hour until the stems are thoroughly dry. In order to render all of the parts of the treating chamber uniform in temperature, so that the stalks which are hung in different parts of the chamber, and especially those at or near the corners may be cured as to color and humidity the same, I lead the products of combustion of the furnace through a rectangular system of pipes of sheet iron such as stove-piping which I have found cheap and effective. Whilst I prefer to use the ranges of temperature and periods of treatment specified, the apparatus may be used advantageously in other methods of curing.

At the corners I provide increased radiating surface, so that a greatly increased volume of heat is disengaged and the temperature becomes uniform throughout the entire body of air in the treating chamber. I attain this result by enlarging the joints of the rectangular system to about double the capacity of the pipes, which may be attained by connecting at the corners sheet-iron drums of double the diameter of the pipes and in length about twice the diameter of the pipe; the lateral pipes are let into the drums near the upper and lower head, thus giving the pipes a low slope, which helps to conserve the diffusion of heat. Lead pipes from the furnace and an eduction pipe from the rectangular system lead to an elbow to the outside of the treating chamber for discharging into the outer air.

In the accompanying drawing illustrating means by which I have obtained excellent results in carrying out my process, Fig. 1 is a sectional view of a barn equipped with apparatus suitable for carrying out my invention.

Fig. 2 is a sectional plan of Fig. 1.

As a curing chamber, an inexpensive structure is commonly constructed on the farm. It is usually a barn-like structure in which cheap materials can be employed, but should be capable of good ventilation and of keeping out rain. At 1 is shown such a structure. At the eaves of the roof 2 are openings 3 for top ventilation. On the floor or ground at a central point of the masonry foundation is let in a cheap furnace, preferably adapted to burn cheap fuel, as waste wood or cordwood available on the farm. The hearth of the furnace projects outside the building to permit stoking from the outside. Leading from the furnace is the distributing lead pipe 5 of a heating system connected at a midpoint of a rectangular pipe-system for conveying the products of combustion of the fuel. The piping I prefer to use is of ordinary stove-pipe section used in domestic heating commonly made of Swedish iron. The pipe 5 joins this system at a midpoint of the pipe 6 at the rear of the curing chamber which connects with enlarged corner drums 7, 7$^a$ at the rear corners a few feet from the wall; thence the heat is led to the front drums 7$^b$, 7$^c$ and pass out at a midpoint of the front pipes 6$^a$ to the chimney 8. The tobacco plants are hung in any proper way as my suspension on laths resting on cross-poles 9 supported on the walls of the barn. The curing chamber may be of any desired size but the usual practice is to employ a barn of 16 to 20 feet in its all three dimensions.

Whilst I have noted certain periods of time and duration and variations of temperature, I remark that this is chiefly by way of example, and measurable variations as well as of proportions of apparatus parts, are within the scope of my invention as defined in the claims.

I am aware that systems employing various ranges and periods of heat treatment have heretofore been employed; my type of apparatus will prove effective under all adequate heat treatments, its prerequisite being means for rendering uniform the temperature in different parts of the curing chamber. I have discovered that the corners of the chamber are the especial locations where the heat must be reinforced. With pipe systems of uniform heat delivery the stalks require a longer treatment to properly cure them, frequently from 8 to 12 hours and if given such treatment the balance of the crop hung remote from the corners is over treated.

My apparatus provides a reenforcement of heat in the regions of the chamber adjacent to the four corners by four long vertical drums of double diameter relatively to the usual size employed thus increasing many times the radiation area and in practical effect equalizing temperatures in the different parts of the barn so that the stalks hung near the corners come to the same color and same humidity as those hung near the center.

Having thus described my invention, what I claim as new and desire to secure by Letters Patent is:—

1. Means for curing tobacco comprising a ventilated chamber housing the tobacco-stalks, a pipe distributing system, a furnace supplying said system with its products of combustion, the pipes being enlarged into drums of considerably larger area at or near the corners of the chamber to form a greater radiating surface to equalize the temperature and heat and color the entire product uniformly.

2. Means for curing tobacco comprising a ventilated chamber housing the tobacco-stalks, a pipe distributing system, a furnace discharging its products of combustion through the pipe system, and drums at the corners of the chamber conveying the products of combustion and in diameter a multiple of the pipe diameter, and in length greater than the pipe diameter.

In testimony whereof I affix my signature.

EDWARD L. RING.